(12) United States Patent
Walker et al.

(10) Patent No.: US 12,174,732 B2
(45) Date of Patent: Dec. 24, 2024

(54) REGRESSION TESTING ON DEPLOYMENT PIPELINES

(71) Applicant: DISH Wireless L.L.C., Littleton, CO (US)

(72) Inventors: William Walker, Northglenn, CO (US); Matthew Johnson, Parker, CO (US)

(73) Assignee: DISH Wireless L.L.C., Littleton, CO (US)

( * ) Notice: Subject to any disclaimer, the term of this patent is extended or adjusted under 35 U.S.C. 154(b) by 6 days.

(21) Appl. No.: 18/174,265

(22) Filed: Feb. 24, 2023

(65) Prior Publication Data
US 2024/0289261 A1    Aug. 29, 2024

(51) Int. Cl.
G06F 11/36    (2006.01)
(52) U.S. Cl.
CPC ...... *G06F 11/3688* (2013.01); *G06F 11/3692* (2013.01)
(58) Field of Classification Search
CPC .......................... G06F 11/3688; G06F 11/3692
See application file for complete search history.

(56) References Cited

U.S. PATENT DOCUMENTS

| | | | |
|---|---|---|---|
| 9,760,366 B2 * | 9/2017 | Frank ..................... | G06F 16/958 |
| 11,775,291 B2 * | 10/2023 | Wagner ..................... | G06F 8/71 |
| | | | 717/168 |
| 2023/0259356 A1 * | 8/2023 | Wagner ..................... | G06F 8/65 |
| | | | 717/168 |

OTHER PUBLICATIONS

Johannes Gmeiner, Automated Testing in the Continuous Delivery Pipeline: A Case Study of an Online Company, May 14, 2015, IEEE (Year: 2015).*
S.A.I.B.S. Arachchi, Continuous Integration and Continuous Delivery Pipeline Automation for Agile Software Project Management, Jul. 30, 2018, IEEE (Year: 2018).*

* cited by examiner

*Primary Examiner* — Wei Y Zhen
*Assistant Examiner* — Amir Soltanzadeh
(74) *Attorney, Agent, or Firm* — Kilpatrick Townsend & Stockton LLP

(57) ABSTRACT

Systems, methods, and machine-readable media may facilitate one or a combination of the following. A software change operation within a deployment pipeline for testing and deploying a software change to a production computing service may be processed. The software change operation may be identified as corresponding to a software change with the deployment pipeline, where the software change may be identified as being configured to make a pipeline change to a configuration of the deployment pipeline itself. Responsive to the identifying, a regression suite configured to run a plurality of test applications on the deployment pipeline to test the deployment pipeline with respect to the software change may be invoked, and the plurality of test applications may be run with the software change. The running the plurality of test applications may include simulating pipeline runs with a plurality of use cases.

18 Claims, 7 Drawing Sheets

REGRESSION TESTING ON DEPLOYMENT PIPELINES

FIELD

Disclosed embodiments according to the present disclosure relate generally to deployment pipelines, and in particular to systems, methods, and computer-readable media for regression testing on deployment pipelines.

BACKGROUND

Generally, deployment pipelines facilitate building, deploying, testing, and releasing software (e.g., applications) in various environments. A deployment pipeline may facilitate centralized management for many applications. The deployment pipeline can be very important because of all the applications using the pipeline to deploy such that, if it is broken, that prevents all the apps from deploying correctly.

There is a need for systems, methods, and computer-readable media for ensuring that changes introduced to deployment pipelines are not going to break existing functionality and are not going to block deployments when changes are rolled out to production. This and other needs are addressed by the present disclosure.

BRIEF SUMMARY

Certain embodiments of the present disclosure relate generally to deployment pipelines, and in particular to systems, methods, and computer-readable media for regression testing on deployment pipelines.

In one aspect, a system is disclosed. The system may include one or more processing devices and memory communicatively coupled with and readable by the one or more processing devices and having stored therein processor-readable instructions which, when executed by the one or more processing devices, cause the one or more processing devices to perform one or a combination of the following operations. A software change operation within a deployment pipeline for testing and deploying a software change to a production computing service may be processed. The software change operation may be identified as corresponding to a software change with the deployment pipeline, where the software change may be identified as being configured to make a pipeline change to a configuration of the deployment pipeline itself. Responsive to the identifying, a regression suite configured to run a plurality of test applications on the deployment pipeline to test the deployment pipeline with respect to the software change may be invoked, and the plurality of test applications may be run with the software change. The running the plurality of test applications may include simulating pipeline runs with a plurality of use cases. The simulating the pipeline runs may include one or a combination of the following for each simulation of a pipeline run with respect to a use case of the plurality of use cases. Functionalities of the use case may be identified. Whether one or more of the functionalities of the use case is adversely affected by the software change may be determined. It may be determined from the running of at least one test application of the plurality of test applications that one or more of the functionalities of one or more of the use cases is adversely affected by the software change. The software change may be mapped to the one or more of the functionalities and the one or more of the use cases adversely affected by the software change. The mapping may be exposed via a user interface.

In another aspect, a method is disclosed and may include one or a combination of the following. A software change operation within a deployment pipeline for testing and deploying a software change to a production computing service may be processed. The software change operation may be identified as corresponding to a software change with the deployment pipeline, where the software change may be identified as being configured to make a pipeline change to a configuration of the deployment pipeline itself. Responsive to the identifying, a regression suite configured to run a plurality of test applications on the deployment pipeline to test the deployment pipeline with respect to the software change may be invoked, and the plurality of test applications may be run with the software change. The running the plurality of test applications may include simulating pipeline runs with a plurality of use cases. The simulating the pipeline runs may include one or a combination of the following for each simulation of a pipeline run with respect to a use case of the plurality of use cases. Functionalities of the use case may be identified. Whether one or more of the functionalities of the use case is adversely affected by the software change may be determined. It may be determined from the running of at least one test application of the plurality of test applications that one or more of the functionalities of one or more of the use cases is adversely affected by the software change. The software change may be mapped to the one or more of the functionalities and the one or more of the use cases adversely affected by the software change. The mapping may be exposed via a user interface.

In yet another aspect, one or more non-transitory, machine-readable media are disclosed. The one or more non-transitory, machine-readable media may have machine-readable instructions thereon which, when executed by one or more processing devices, cause the one or more processing devices to perform one or a combination of the following operations. A software change operation within a deployment pipeline for testing and deploying a software change to a production computing service may be processed. The software change operation may be identified as corresponding to a software change with the deployment pipeline, where the software change may be identified as being configured to make a pipeline change to a configuration of the deployment pipeline itself. Responsive to the identifying, a regression suite configured to run a plurality of test applications on the deployment pipeline to test the deployment pipeline with respect to the software change may be invoked, and the plurality of test applications may be run with the software change. The running the plurality of test applications may include simulating pipeline runs with a plurality of use cases. The simulating the pipeline runs may include one or a combination of the following for each simulation of a pipeline run with respect to a use case of the plurality of use cases. Functionalities of the use case may be identified. Whether one or more of the functionalities of the use case is adversely affected by the software change may be determined. It may be determined from the running of at least one test application of the plurality of test applications that one or more of the functionalities of one or more of the use cases is adversely affected by the software change. The software change may be mapped to the one or more of the functionalities and the one or more of the use cases adversely affected by the software change. The mapping may be exposed via a user interface.

In various embodiments, the software change operation may correspond to an instantiation of a branch of the deployment pipeline. In various embodiments, the software change operation may correspond to a merge request to merge a branch of the deployment pipeline into the deployment pipeline. In various embodiments, the software change operation may correspond to communicating code corresponding to the software change to a software repository system. In various embodiments, the software change may include a change to a deployment pipeline template. In various embodiments, the simulating the pipeline runs may include performing a test of a plurality of tests on the deployment pipeline for each use case of the plurality of use cases, and each test of the plurality of tests may be mapped to a particular use case of the plurality of use cases. In various embodiments, one or more of the simulations of one or more of the pipeline runs with respect to one or more of use cases of the plurality of use cases may include using a dummy application with its variables and associated configurations stored in a template, where the dummy application may be executed with respect to the deployment pipeline to test the software change. In various embodiments, details of the one or more of the functionalities and the one or more of the use cases adversely affected by the software change may be exposed via the user interface.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
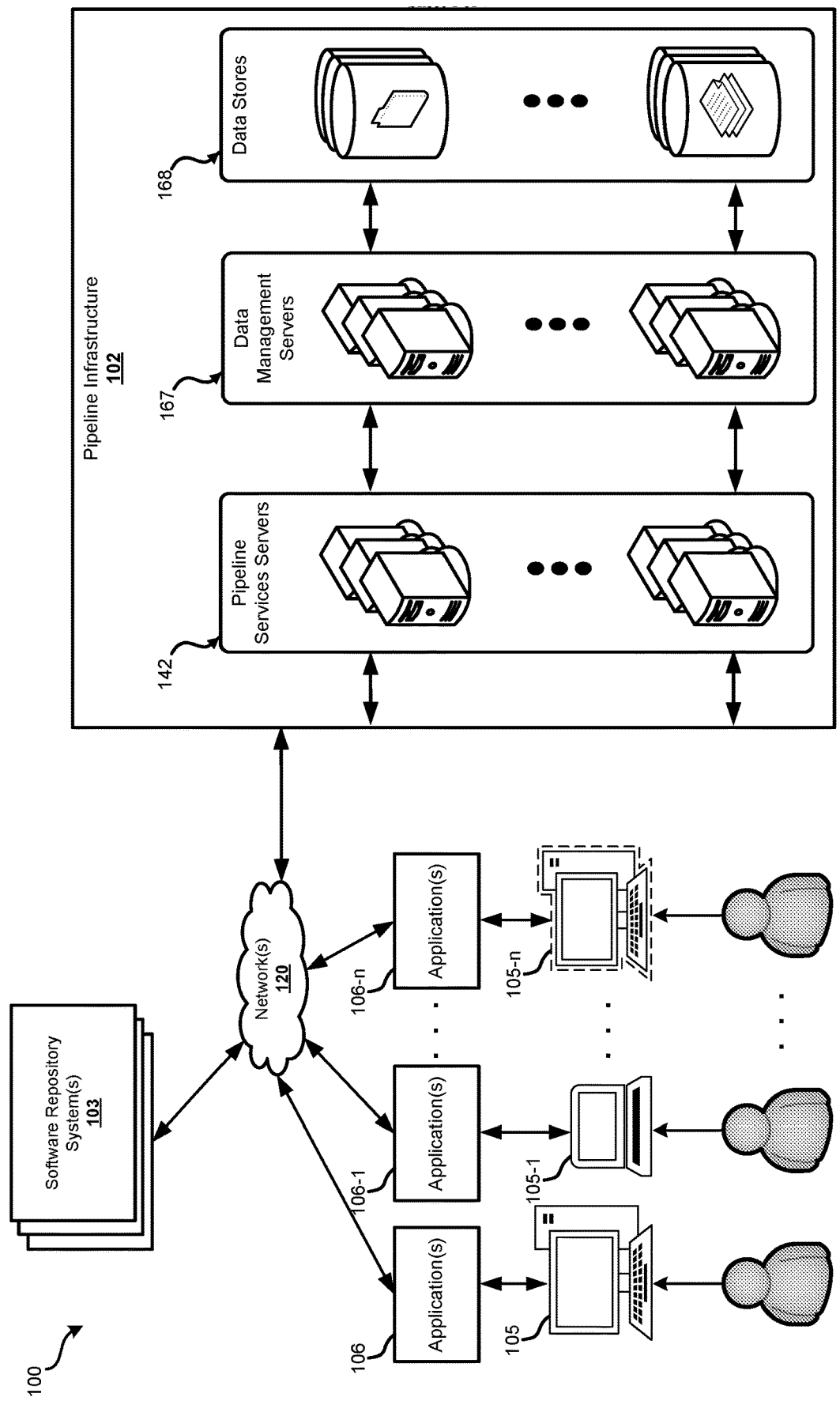
FIG. 1 illustrates a high-level block diagram of an environment to facilitate a production computing service deployment via continuous deployment pipeline, in accordance with embodiments according to the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Various embodiments according to the present disclosure may provide for technological solutions to multiple problems existing with conventional deployment pipelines, systems, and approaches to changes in deployment pipelines used to facilitate production computing services. Conventional systems and approaches are deficient in addressing, with flexibility, speed and stability, software changes in a manner that is streamlined to the pipeline processes and that protects the pipeline from detrimental and/or degrading effects of the changes on the pipeline. However, various embodiments according to the present disclosure may provide for automation of processes handling software changes and testing of the software changes in an application deployment pipeline, which may accelerate the speed of testing of software changes, ensuring the stability of the pipeline in view of the software changes, and making the software changes, while providing flexibility to accommodate a variety of software change needs and in a manner that is streamlined.

Various embodiments will now be discussed in greater detail with reference to the accompanying figures, beginning with FIG. 1.

FIG. 1 depicts a high-level block diagram of an environment 100 to facilitate a production computing service deployment via continuous deployment pipeline, in accordance with certain embodiments of the present disclosure. In some embodiments, the environment 100 may be a cloud computing environment. The environment 100 may correspond to a distributed system that includes one or more client computing devices 105. In various embodiments, each client computing device 105 may be configured to operate one or more client applications 106 such as a web browser, a proprietary client application, a web-based application, an entity portal, a mobile application, a widget, or some other application, which may be used by a user of the endpoint device to interact with the pipeline infrastructure 102 and the software repository systems 103 to use services provided by the pipeline infrastructure 102 and the software repository systems 103 over one or more network(s) 120.

A developer, using a client computing device 105, may interact with the pipeline infrastructure 102 by requesting one or more services provided by the pipeline infrastructure 102. In some embodiments, the developer may access a cloud user interface. The pipeline services provided by the pipeline infrastructure 102 may include virtual machine instances for the developers to use, in some embodiments. The client computing devices 105 may be general purpose personal computers including, by way of example, personal computers and/or laptop computers running various versions of Microsoft Windows®, Apple Macintosh®, and/or Linux operating systems. The client computing devices can be workstation computers running any of a variety of UNIX® or UNIX-like operating systems, including without limitation the variety of GNU/Linux operating systems, such as for example, Google Chrome OS. Alternatively, or in addition, client computing devices 105 may be any other electronic device, such as a thin-client computer capable of communicating over network(s) 120. The client computing devices 105 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, and/or the like, and being Internet, email, short message service (SMS), or other communication protocol enabled.

In general, the one or more networks 120 may be used for bi-directional communication paths for data transfer between components of environment 100. Disclosed embodiments may transmit and receive data, including video content, via the networks 120 using any suitable protocol(s). The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In various instances, the networks 120 may transmit data using any suitable communication protocol(s), such as TCP/IP (Transmission Control Protocol/Internet protocol), SNA (systems network architecture), IPX (Internet packet exchange), UDP, AppleTalk, and/or the like.

One or more server systems may be communicatively coupled with one or more remote computing devices 105 via the network(s) 120. For example, the environment 100 may include a pipeline infrastructure 102 that may include or otherwise correspond to one or more server systems. Further, the environment 100 may include one or more software repository systems 103 that may include or otherwise correspond to one or more server systems. Likewise, in some embodiments, the client computing side of the environment 100 may include or otherwise correspond to one or more server systems.

In various embodiments, the one or more server systems may be adapted to run one or more services or software applications provided by one or more of the components of the respective system (e.g., the pipeline infrastructure 102). In some embodiments, these services may be offered as web-based or cloud services or under a Software as a Service (SaaS) model to the users of client computing devices 105. Users operating client computing devices 105 may in turn utilize one or more client applications to interact with the pipeline infrastructure 102 and/or the one or more software repository systems 103 to utilize the services provided by these components.

The one or more server systems of the pipeline infrastructure 102 may implement software components to facilitate various embodiments disclosed herein. In some embodiments, one or more of the components of the pipeline infrastructure 102 and/or the services provided by components thereof may also be implemented by one or more of the client computing devices 105. Users operating the client computing devices 105 may then utilize one or more client applications 106 to use the services provided by these components. These components may be implemented in hardware, firmware, software, or combinations thereof. It should be appreciated that various system configurations are possible, which may be different from the distributed system. The embodiment shown in the figure is thus one example of a distributed system for implementing an exemplary system and is not intended to be limiting.

As illustrated, various embodiments may include one or more pipeline services servers 142, one or more data management servers 167 configured to manage pipeline services data and one or more data stores 168 (which may store pipeline services data), and/or the like. The one or more pipeline services servers 142 may be configured to provide deployment pipeline services (e.g., to developers using the client computing devices 105) to facilitate production computing services. With the pipeline services provided, developers may provision, launch and manage virtual computing resources in the cloud. Such cloud-based pipeline services may be provided for various geographic locations/regions and may be segregated in a variety of manners according to geographic, jurisdictional, and/or designs to minimize faults, maximize availability, minimize latency, and/or the like.

In some embodiments, the services provided by the pipeline infrastructure 102 may include one or more services provided under Software as a Service (SaaS) category, Platform as a Service (PaaS) category, Infrastructure as a Service (IaaS) category, or other categories of services including hybrid services. Developers may order one or more services provided by the pipeline infrastructure 102. The pipeline infrastructure 102 may then perform processing to provide the services in accordance with the orders. In some embodiments, the services provided by the pipeline infrastructure 102 may include, without limitation, application services, platform services, and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, developers may utilize applications executing on the cloud pipeline infrastructure 102. Various SaaS services may be provided.

In some embodiments, platform services may be provided by the cloud pipeline infrastructure 102 via a PaaS platform. The PaaS platform may be configured to provide cloud pipeline services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. By utilizing the pipeline services provided by the PaaS platform, developers may employ programming languages and tools supported by the cloud infrastructure system and control the deployed services. In some embodiments, platform services provided by the cloud infrastructure system may include database cloud services, middleware cloud services, and Java cloud services. Middleware cloud services may provide a platform for developers to develop and deploy various business applications, and Java cloud services may provide a platform for customers to deploy Java applications, in the cloud pipeline infrastructure system 102. Various infrastructure services may be provided by an IaaS platform in the cloud pipeline infrastructure system 102. The infrastructure services facilitate the management and control of the underlying computing resources, such as storage, networks, and other fundamental computing resources for users utilizing services provided by the SaaS platform and the PaaS platform.

In some embodiments, cloud management functionality may be provided by one or more modules, such as an order management module, an order orchestration module, an order provisioning module, an order management and monitoring module, an identity management module, and/or the like. These modules may include or be provided using one or more computers and/or servers, which may be general purpose computers, specialized server computers, server farms, server clusters, or any other appropriate arrangement and/or combination.

In various embodiments, the pipeline infrastructure 102 may be composed of one or more specialized computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, the pipeline infrastructure 102 may be adapted to run one or more services described herein. The pipeline infrastructure 102 may run an operating system, which may correspond to a server operating system. The pipeline infrastructure 102 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM (International Business Machines), and the like.

In some implementations, the pipeline infrastructure 102 may include one or more applications to analyze and consolidate data feeds and/or event updates received from users of client computing devices 105. As an example, data feeds and/or event updates may include, but are not limited to, updates, which may be real-time updates, received from the one or more client computing devices 105, the software repository system 103, and/or other components of the pipeline infrastructure 102, which may include real-time events related to deployment, software change requests, software changes (which may include new applications and/or changes to applications), and the like aspects disclosed herein. The pipeline infrastructure 102 may also include one or more applications to display the data feeds and/or real-time events via one or more display devices of client computing devices 105.

The one or more data stores 168 may include one or more databases that may reside in a variety of locations. By way of example, one or more databases may reside on a non-transitory storage medium local to (and/or resident in) one or more servers of the pipeline infrastructure 102. Alternatively, databases may be remote from one or more servers and in communication with the one or more servers via a network-based or dedicated connection. In one set of embodiments, databases may reside in a storage-area network (SAN). Similarly, any necessary files for performing the functions attributed to the one or more servers may be stored locally on the one or more servers and/or remotely, as appropriate. In one set of embodiments, the databases may include relational databases that are adapted to store, update, and retrieve data in response to SQL-formatted commands.

The pipeline services provided by the pipeline infrastructure 102 may be structured in stages and may facilitate building, testing, and releasing software (e.g., applications) to production services. Further, once software is deployed to production service, various changes to the software may be needed (e.g., the code, application, and/or specifications corresponding to a change in previously deployed software). The process of making software changes may involve software change request (SCR) processes. As referenced herein, a software change request (SCR) may include not only the request, but also the software change (e.g., the code, application, and/or specifications corresponding to the software change). Moreover, while embodiments may be disclosed herein with respect to SCRs as an example, the embodiments may likewise be applicable to initial code deployments and not just the software changes that follow initial code deployments.

Figure 2:
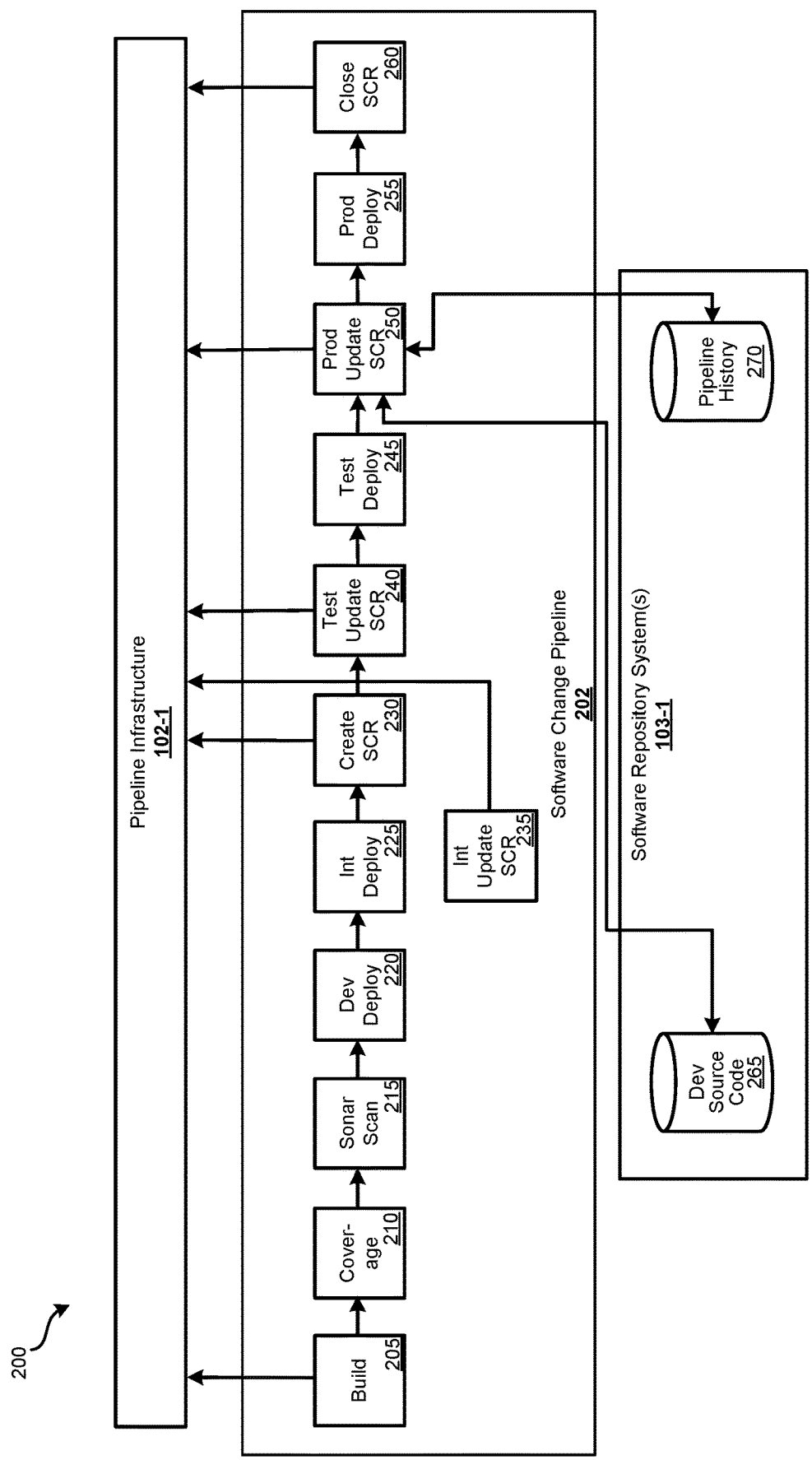
FIG. 2 illustrates a functional diagram of one example pipeline system to facilitate pipeline services, in accordance with embodiments according to the present disclosure.

FIG. 2 illustrates a functional diagram of one example pipeline system 200 to facilitate pipeline services, in accordance with embodiments of the present disclosure. The pipeline system 200 may include one or a combination of the pipeline infrastructure 102, a software change pipeline 202, and one or more software repository systems 103. The software change pipeline 202 may be configured to operate in accordance with a pipeline flow to facilitate pipeline services. The software change pipeline 202 may be a centralized pipeline. The software change pipeline 202 may be configured to facilitate building and deploying functions (e.g., serverless functions, in some embodiments). In some embodiments, software change pipeline 202 may be configured to operate as a serverless pipeline, and, by way of example without limitation, the building and deploying of serverless functions may be in AWS Lambda, with support for Python, Java using SAM build, and Java using Maven build.

The software change pipeline 202 may be a custom pipeline that allows for creation of a template corresponding to a software build and then using of the template across potentially hundreds of apps or more, reusing the automation. Therefore, when a software change is introduced, it is important to validate the change thoroughly to avoid negatively affecting all the apps. The software change pipeline 202 flow may illustrate deployment stages of the software change pipeline 202, through at least some of which software changes may progress.

The pipeline services may include pipeline deployment agents of the pipeline infrastructure 102 that may include software applications to automate software deployment and software changes deployment through various stages to production services corresponding to a production deployment 255. Such automation of software and software change deployments may include continuously integrating software, configuration states, scripts, artifacts, and or the like into production services corresponding to production deployment 255. The pipeline deployment agents may facilitate the deployment pipeline in stages that may include preproduction stages, where the developed software may be automatically tested. The stages may further include deployment integration testing with the software deployed in a preproduction environment, which may allow for testing with traffic and data that may correspond to actual traffic and data that will be experienced in the production environment. In various embodiments, such preproduction stages and/or deployment integration stages may include a build stage 205, a coverage stage 210, a sonar-scan stage 215, an initial development environment 220, an integration environment 225, an SCR creation stage 230, an SCR integration update stage 235, an SCR testing update stage 240, a deployment testing stage 245, an SCR production update stage 250, and/or other alpha, beta, and/or gamma testing stages. Once gamma testing is successfully completed and validated, the software may be pushed to production with the production stage 255. This may involve the pipeline deployment agents partially, incrementally, and/or fully deploying the software to production service.

With one or more of the preproduction stages, the pipeline deployment agents may build executables (e.g., applications, code segments, etc.) of the software and software changes from a source code repository 265 (e.g., software repository system 103), which may store the software and software change specifications provided in part by the developers. In some embodiments, each app may get one repo with its source code, SAM templates for each environment (dev, int, test, and prod), as well as an SCR input file. Devs may also include a sonar properties file for coverage testing. The pipeline 202 may be tag-based, so each new deployment may be associated with a new tag. Most of the stages may use external scripts and respect branch deploy script variables, branch serverless script variables, and other branch script variables.

The build stage 205 may execute build steps, as well as onboarding to a log shipper if enabled. The build stage 205 may run first in the pipeline 202. The build stage 205 may include executing one or more build scripts that may utilize one or more template files to build the software and functions. The pipeline 202 may check for the presence of all required environment variables, such as account ID for the dev environment, bucket name for the dev environment, infrastructure endpoint URL, and/or the like. Template files may be linted for defined function names, sufficient memory allocation, runtime requirements, and/or the like. An app may be built according to its requirements, leaving artifacts (e.g., files created by the build process, WAR files, distribution packages, etc.) in a build directory for the rest of the stages to use.

The coverage stage 210 may execute unit tests and coverage reporting to pass to sonar-scan. The coverage stage 210 may include executing jobs to convert the coverage output to Cobertura if needed for parsing. There may be a code coverage stage for each type of app that can flow through the pipeline 202. In some implementations, coverage packages may be used for Python and Java, for example. The coverage stage 210 may be decoupled from the build stage 205 and may execute in parallel. The sonar-scan stage 215 may include a sonar module that may scan coverage reports and source code. The sonar-scan stage 215 may execute after the coverage stage 210 and independently of all other stages. The sonar-scan stage 215 may run quality gates and other code quality checks on source code.

The dev-deploy stage 220 may execute automatically after the build stage 205 is successfully executed, only deploying to the dev environment automatically. The int-deploy stage 225 may also be a deploy stage to deploy to int environment. One or more deploy scripts execute across all environments and may check for the presence of all required environment variables, such account ID for a specified environment, a bucket name for a specified environment, an infrastructure endpoint URL, an infrastructure role to assume when deploying, an authentication token, and/or the like. The pipeline 202 may use different templates for different environments that may specify subnets, security groups, and other configuration specifications for the different environments. The int-deploy stage 225 may unlock after dev-deploy is successful.

As illustrated, an SCR may be introduced after developers trigger software deployment into the development environment 220 and the integration environment 225. After deployment to the integration environment 225, but before deployment to the deployment testing stage 245, an SCR may be created at the SCR creation stage 230. The SCR creation may be triggered automatically after a successful integration deployment.

The create SCR stage 230 may start the SCR process, to create the SCR. The create SCR stage 230 may include a module that creates an SCR using the provided details in an SCR input file and stores the SCR number in build artifact for future jobs. The create SCR stage 230 may unlock after a successful dev-deploy. The int update stage 235 may automatically follow. The int update stage 235 may include a module that updates the associated SCR with a current environment of the pipeline 202 in the pipeline flow.

The test-deploy stage 245 may start with the test SCR update stage 240, and may deploy to test. Execution of the test-SCR-update job corresponding to the test SCR update stage 240 may trigger test-deploy. The test-deploy stage 245 may unlock after successful int-deploy and int-SCR-update. The prod deploy stage 255 may start with a prod-SCR-update, and then deploy to prod. Prod-SCR-update may automatically start prod-deploy. The prod deploy stage 255 may unlock after successful test-deploy. The SCR close stage 255 may be the final stage, with the closing of the SCR. The SCR close stage 255 may include a module that closes the associated SCR as either complete or incomplete.

The pipeline deployment agents may run automated tests on the executables and monitor the tests to identify correct functioning, errors, conflicts, performance metrics, etc. as the executables progress toward production deployment 255. Upon successful testing and validations, the pipeline deployment agents may advance the executables to toward production deployment 255. However, when incorrect functioning, errors, conflicts, failures to satisfy performance metrics threshold, and/or the like are identified, the pipeline deployment agents may rollback the executables to a prior version and/or stage, and may notify the developers of pertinent log data, test results, reports, and/or the like regarding the unsuccessful testing and/or validations. Further details regarding pipeline operations are disclosed in U.S. application Ser. No. 18/068,126, filed Dec. 19, 2022, which is incorporated by reference as if fully set forth herein for all purposes.

A pipeline configuration for the pipeline 202 may correspond to a pipeline template file. The pipeline template file may describe, specify, configure, and/or otherwise allow for the deployment process of FIG. 2. The pipeline template file may include text, specifications, instructions, code, and/or the like regarding how to build the pipeline 202. The pipeline template file may be communicated to one or more software repository systems 103 and/or the pipeline infrastructure 102 to instruct the one or more of the software repository systems 103 and/or the pipeline infrastructure 102 to build the pipeline 202. The pipeline template file may be stored in one or more software repository systems 103 and may, in some embodiments, be stored in repository 265, for example.

Figure 3:
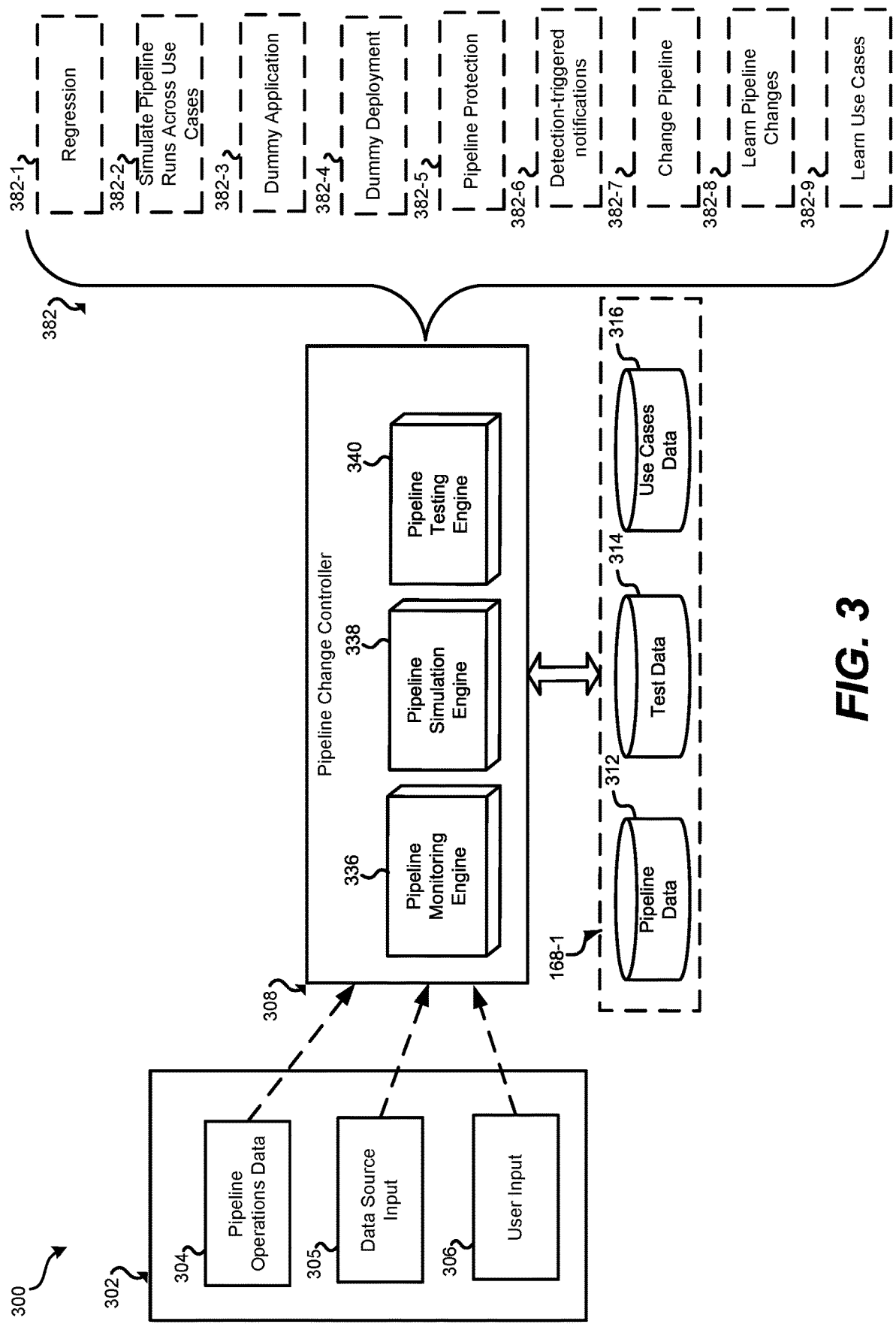
FIG. 3 illustrates a functional diagram of a subsystem to perform regression testing on deployment pipelines with the pipeline system, in accordance with embodiments according to the present disclosure.

FIG. 3 illustrates a functional diagram of a subsystem 300 to perform regression testing on deployment pipelines with the pipeline system 200, in accordance with certain embodiments of the present disclosure. While the subsystem 300 is illustrated as being composed of multiple components, the subsystem 300 may be broken into a greater number of components or collapsed into fewer components. Each component may include any one or combination of computerized hardware, software, and/or firmware.

In some embodiments, the pipeline infrastructure 102 may include the subsystem 300. In some embodiments, the pipeline infrastructure 102 may be configured to cooperate the applications 106 to provide the features of the subsystem 300, with aspects of the subsystem 300 distributed between the client computing devices 105 and the remotely-located pipeline infrastructure 102. In some embodiments implementing the subsystem 300 at least partially with the pipeline infrastructure 102, the subsystem 300 may be, correspond to, and/or include one or more servers one or more network interfaces, one or more processors, memory, and/or other components disclosed herein. The subsystem 300 may be configured to detect software changes that potentially change the pipeline template file and, hence, the pipeline 202 itself.

As SCRs move through the application deployment pipeline, SCR creation and updates on the SCRs (and corresponding code/application) may be made by the subsystem 300 in an automated way.

In some embodiments, the subsystem 300 may include one or more adaptive processing and controlling devices 308 (which may be referenced as "pipeline change controller" or "pipeline controller") and one or more storage repositories that may correspond to data stores 168. In some embodiments, the pipeline controller 308 may correspond to one or more software repository systems 103. In various embodiments, the one or more adaptive processing and controlling devices 308 may include one or more of engines and/or modules that may be stored in the one or more memories and may include one or more software applications, executable with the processors, for receiving and processing requests and communications. The one or more of engines and/or other modules may be configured to perform any of the steps of methods described in the present disclosure.

The pipeline controller 308 may be configured to detect software changes that potentially change the pipeline template file through source control with respect to the pipeline template file. In some embodiments, the pipeline controller 308 may track changes to pipeline files, including the pipeline template file, for example, using a monitoring engine 336. The pipeline template file may be pushed up to a software repository system 103 (e.g., with a commit operation with respect to the software repository system 103). If a developer makes a change to the pipeline template file, the change may be pushed with a commit to the software repository system 103. The change and the developer making the change may be tracked by the pipeline controller 308. When a developer pushes a change to the pipeline template file, the pipeline controller 308 may run regression testing on the new changes.

Figure 4:
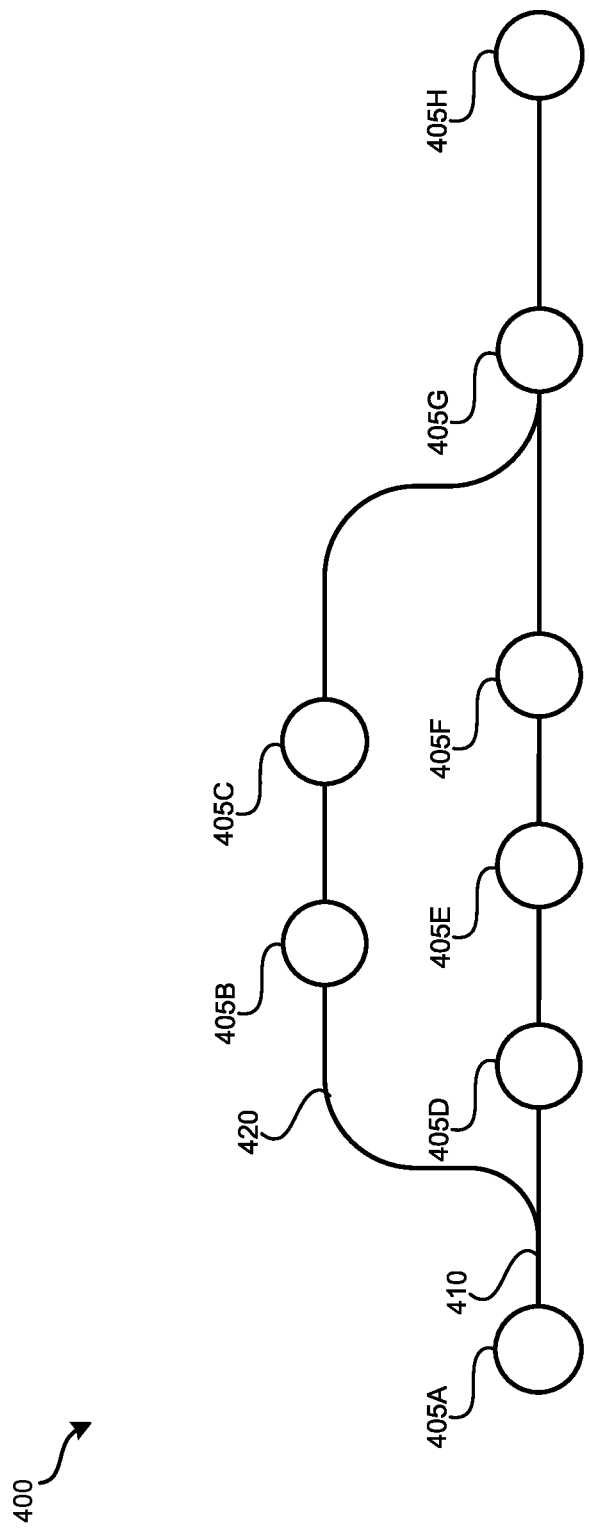
FIG. 4 illustrates commits to the software repository system that may correspond to changes made to the pipeline template file, in accordance with embodiments according to the present disclosure.

FIG. 4 illustrates commits to the software repository system 103 that may correspond to changes made to the pipeline template file. Each of 405A-405H may represent commits to the software repository system 103. By way of example, commits 405A, 405D, 405E, 405F, 405G, and 405H may correspond to those commits which are made to the main line 405 (sometimes referred to as a main branch) and may correspond to changes which are actually made to the pipeline template file. When changes are to be made to the pipeline template file, a branch 420 may be instantiated to allow the making of the changes without affecting the actual pipeline template file and to allow regression testing to be performed with respect to the changes prior to the changes being allowed to be made to the actual pipeline template file. A branch 420 may take the changes from the last commit 405A and allow changes to an instantiation of the pipeline template file on the branch 420 while maintaining the actual state of the pipeline template file according to the main line 410. Commits 405B and 405C, for example, may correspond to those commits and corresponding change to the instantiation of the pipeline template file which are made to the branch 420.

When changes are made to the pipeline template file, the regression suite may run automatically with respect to the changes and the instantiation of the pipeline template file as commits are pushed in the branch 420. Depending on the results of the regression, the changes made in the branch 420 may or may not be allowed to merge back into the main line 410. If the regression testing is fully successful, the changes made in the branch 420 may be allowed to merge back into the main line 410 so that the branch commits 405B and 405C are merged with the main line 410, where the state of the pipeline template file may or may not have changed since initiation of the branch 420 (e.g., the pipeline template file may or may not have changed per one or more commits to the main line 410, such as one or more of commits 405D, 405E, and/or 405F).

Referring again to FIG. 3, as depicted, the subsystem 300 may include one or more repositories 168. For example, in various embodiments, a pipeline data repository 312 may store any suitable data pertinent to the deployment pipeline, such as input collected, pipeline state data, declared state specifications, pipeline configuration specifications, pipeline variables, pipeline functions, pipeline versions, pipeline topology specifications, connectivity data, design specifications, pipeline templates, pipeline simulation data, dummy deployments, dummy applications, pipeline rules, pipeline protocols, pipeline criteria, pipeline process flows, and/or the like to facilitate testing features disclosed herein. In various embodiments, a test data repository 314 may store any suitable data pertinent to a regression suite, test applications, test rules, test protocols, test criteria, test process flows, test results, mappings of tests and use cases, observation data regarding tests, patterns regarding tests, conclusions regarding tests, inferences regarding tests, software change categorization, correlation, qualification, scoring, and/or the like to facilitate testing features disclosed herein. In various embodiments, a use cases data repository 316 may store any suitable data pertinent to use cases, use case specifications, use case rules, use case protocols, use case criteria, use case process flows, use case applications, use case functions and functionalities, mappings of use cases and tests, use case variables, use case language specifications, observation data regarding use cases, patterns regarding use cases, conclusions regarding use cases, inferences regarding use cases, and/or the like to facilitate testing features disclosed herein. Although the repositories are depicted as being separate, in various embodiments, a single repository may be utilized, or separate repositories may be used in any suitable manner.

In some embodiments, the one or more engines of the pipeline controller 308 may include one or more pipeline monitoring engines 336 that may include logic to implement and/or otherwise facilitate the pipeline monitoring features disclosed herein, such as monitoring effects of software changes on pipeline run simulations and collecting pipeline data in order to facilitate simulating the deployment pipeline by one or more pipeline simulation engines 338. In various embodiments, for example, the pipeline controller 308 (e.g., using the one or more monitoring engines 336) may receive pipeline input 302 by way of one or a combination of API calls, push operations, pull operations, polling operations, listening to one or more communication buses, and/or the like. The pipeline controller 308 may be communicatively coupled with interface components and communication channels (which may take various forms in various embodiments as disclosed herein) configured to receive pipeline input 302.

As depicted, the pipeline input 302 may include pipeline operations data 304, software repository system input 305, and user input 306. The subsystem 300 may process the pipeline input 302 and analyze the pipeline input 302 to provide for the software change testing features disclosed herein. The software repository system input 305 may correspond to input received from the one or more software repository systems 103, such as source code 265, pipeline history information 270, and/or the like, that may be received via one or more data acquisition interfaces of the pipeline infrastructure 102. The user input 306 may, for example, correspond to selections and other input provided by developers via interface elements of the client computing devices 105, as disclosed herein. In some embodiments, the user input 306 may include source code directly provided by the developers, instead of, or in addition to, receiving source code from a software repository system 103. For example, various input may be provided in various forms (e.g., input files, input entry into the fields of a GUI, selection of GUI options, drag-and-drop options, and/or the like).

In some embodiments, the one or more monitoring engines 336 may use one or more pipeline deployment agents to implement and/or otherwise facilitate the pipeline monitoring and pipeline test monitoring features. For example, as part of the pipeline monitoring, the one or more monitoring engines 336 may monitor operations of the deployment pipeline for testing. Such monitoring may include monitoring aspects of the pipeline to facilitate exact replicas of the pipeline or portions thereof, to facilitate the simulations of the pipeline for testing, to facilitate dummy applications or other aspects of the pipeline for testing, and monitoring operations as part of the testing of software changes on simulations and dummy applications.

The one or more pipeline simulation engines 338 of the pipeline controller 308 may include that may include logic to implement and/or otherwise facilitate the pipeline simulation features disclosed herein. In various embodiments, for example, the pipeline controller 308 (e.g., using the one or more simulation engines 338) may simulate one or more portions of the deployment (e.g., with one or more branches 420 of the deployment pipeline) and/or the deployment pipeline as a whole, which may be based at least in part on one or more deployment pipeline templates that are created, developed, and/or updated by the one or more pipeline simulation engines 338 based at least in part on the pipeline data collected by the one or more pipeline monitoring engines 336.

The one or more engines of the pipeline controller 308 may include one or more pipeline testing engines 340 that may include logic to implement and/or otherwise facilitate the pipeline testing features disclosed herein. In various embodiments, for example, the pipeline controller 308 (e.g., using the one or more testing engines 340) may be configured to cause execution of one or more pipeline testing features 382 disclosed herein. By way of example, the pipeline testing features 382 may include executing a regression suite 382-1, which may include a set of test applications; simulating pipeline runs across a different use cases 382-2 with configurations corresponding to the pipeline configurations; instantiating and running dummy applications 382-3 with configurations corresponding to the pipeline applications; running dummy deployments 382-4, with, for example, one or more test apps event testing one or more particular scenarios corresponding to one or more use cases; pipeline protection 382-5, which may include identifying when one or more software changes fail one or more tests and would adversely affect the deployment pipeline and prohibiting/blocking merging of the one or more software changes with the deployment pipeline, with corresponding rollback operations of the one or more software changes via the testing flow; software change test failure/success detection-triggered notifications 382-6, which may facilitate pipeline flow operations and/or prompting of developers to take actions (e.g., in conjunction with rollback operations); merging successfully tested software changes with the deployment pipeline 382-7, where, for example, the changes may be automatically (or upon manual approval in some embodiments) added to the deployment pipeline and all of the pipeline apps may then use the new pipeline changes; facilitating the subsystem 300 learning the merged pipeline changes 382-8, where, for example, the pipeline monitoring engine 336 and/or the pipeline simulation engine 338 may be triggered to learn the resulting changed state of the pipeline and incorporate the pipeline changes into the pipeline specifications and declared state for subsequent use with simulation, testing, etc.; facilitating the subsystem 300 learning use cases/changes consequent to the merged pipeline changes 382-9, where, for example, the pipeline monitoring engine 336 and/or the pipeline simulation engine 338 may be triggered to learn the resulting changes to the set of use cases due to the pipeline changes; and/or the like pipeline testing features disclosed herein.

In various embodiments, for example, the pipeline controller 308 (e.g., using the one or more testing engines 340) may be configured to invoke and run a regression suite 382-1 that is configured to run a plurality of test applications on the deployment pipeline to test the deployment pipeline with respect to one or more software changes that the pipeline controller 308 identifies as being configured to make one or more pipeline changes to a configuration of the deployment pipeline itself. Consequently, the subsystem 300 may ensure that the one or more pipeline changes are not going to break existing functionalities and are not going to block deployments when the one or more pipeline changes are rolled out to production. The pipeline controller 308 may trigger the regression testing suite to regression test the one or more pipeline changes against the pipeline itself automatically consequent to a merge request. For example, a proposed software change could be for speeding up the deployment pipeline. A developer may be working on a branch of the pipeline and may make a merge request to merge it into the main pipeline. The pipeline branch and the merge request may correspond to user input 306. That request may kick off the regression suite. Additionally or alternatively, the pipeline controller 308 may trigger the regression testing suite to regression test the one or more pipeline changes against the pipeline itself automatically consequent to any commit being made to a branch.

Figure 5:
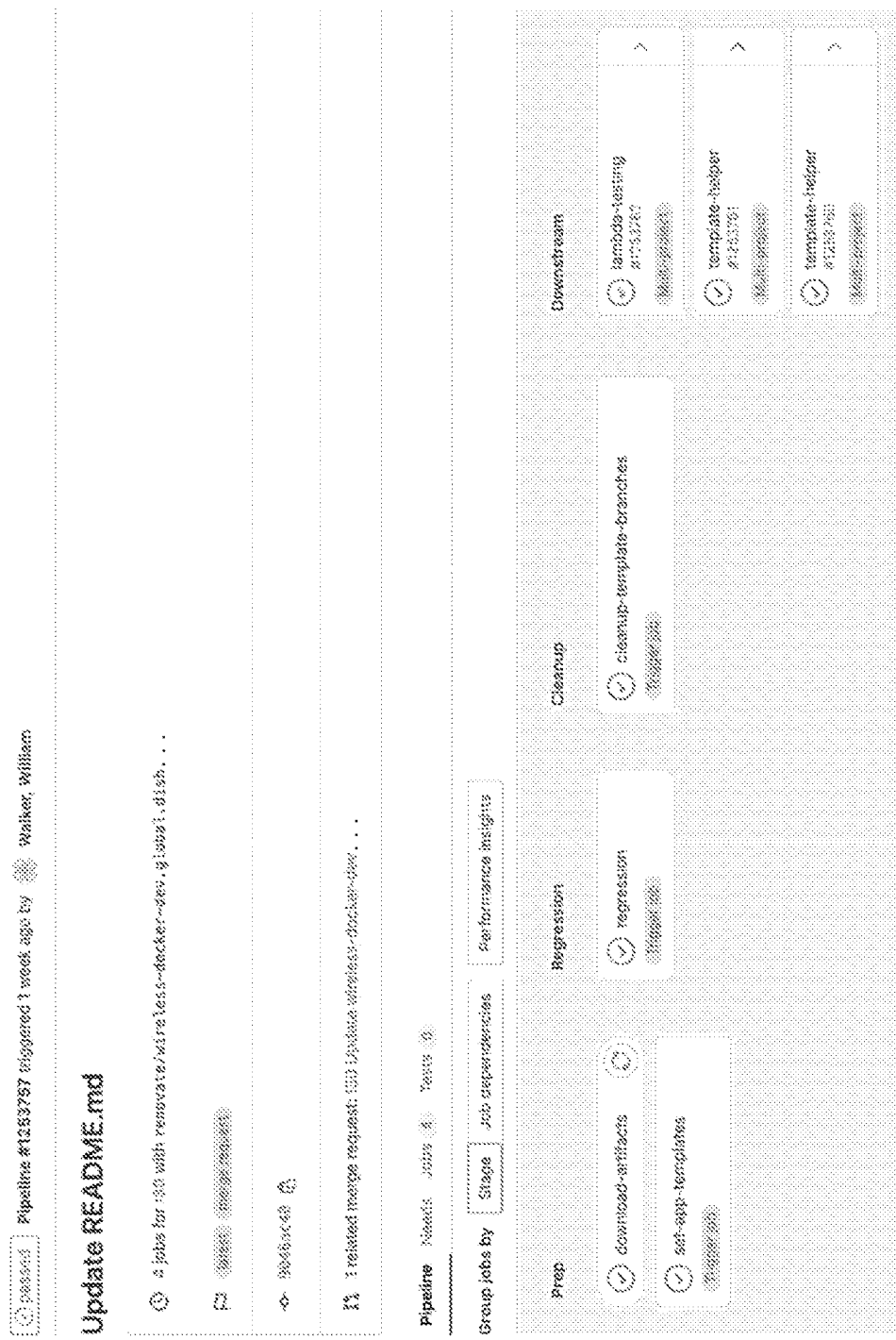
FIG. 5 illustrates a portion of an example user interface corresponding to a merge request having initiated a merge request flow, in accordance with embodiments according to the present disclosure.

FIG. 5 illustrates a portion of an example user interface 500 corresponding to the merge request having initiated a merge request flow, in accordance with embodiments of the present disclosure. The user interface 500 may expose merge request stages 505 (e.g., prep, regression, cleanup, etc.) with user interface elements graphically depicting the merge request stages and current statuses of the merge request stages. In various embodiments, one or more of the merge request stages 505 may be automatically run without user initiation. In some embodiments, the user interface 500 may be provided with user-selectable user interface elements for a user to provide input, make selections, and/or control aspects of the merge request flow. For example, the user interface 500 may include buttons to execute, pause, stop, cancel, and/or the like one or more operations and/or stages of the merge request flow. In some embodiments, for example, by a user selecting a play button, for example, the pipeline stage may execute, and the merge request flow may transition to the next step/stage. In some embodiments, the buttons may be configured to not be displayed, or be displayed but be unselectable, until the corresponding merge request stage 505 has progressed through the merge request flow such that one or more operations corresponding to the buttons are currently available as options. With the user interface 500, the subsystem 300 may provide updates as the merge request flow progresses.

The regression suite may be run automatically whenever one or more changes to a centralized deployment pipeline template are attempted. It may be more challenging to regression test with scripting and automation a pipeline than to regression test an app. Regression testing a pipeline with scripting and automation may include simulated pipeline runs across many different scenarios that may correspond to many different uses, functions, and operations of the pipeline. A submitted change must pass all the scenarios before it goes into play. The regression testing results may provide proof of validation, as the regression testing may eliminate pipeline errors and provide proof that pipeline software changes ran correctly with the pipeline configuration.

With the regression suite, the pipeline controller 308 (e.g., using the one or more testing engines 340) may run the plurality of test applications with the one or more software changes. This may include simulating pipeline runs with a set of various use cases 282-2, where the test apps may be used to run a dummy deployment with the new pipeline changes to make sure that nothing is broken. Accordingly, the regression testing may cover all the possible cases that the pipeline has to cover. For example, the pipeline may be responsible for deploying Java apps, pipeline apps, and a variety of other scenarios. There may be one or more test apps for each language and/or use case. So, for example, say there is a Java application, and the variables are to be stored in the deployment templates, all the configuration that would be needed to do that may be determined. All that configuration may be in a test application corresponding to a Java template. A dummy application may be instantiated, where the dummy application may provide its variables in a template, which may be deployed in a deployment pipeline environment. One or more of the simulations of pipeline runs with respect to one or more use cases may include using the dummy application with its variables and associated configurations stored in a template, where the dummy application is executed with respect to the deployment pipeline to test the software change. There may be a test case for a Java app that is sending its variables with the template, there may be a test case for a Java app that is sending its variables with environment variables, etc. to determine if that possible use is broken with the change. For each simulation of a pipeline run with respect to a use case of the set of various use cases, the pipeline controller 308 may identify a set of functionalities of the use case and determine whether one or more of the functionalities of the use case is adversely affected by the software change.

Figure 6:
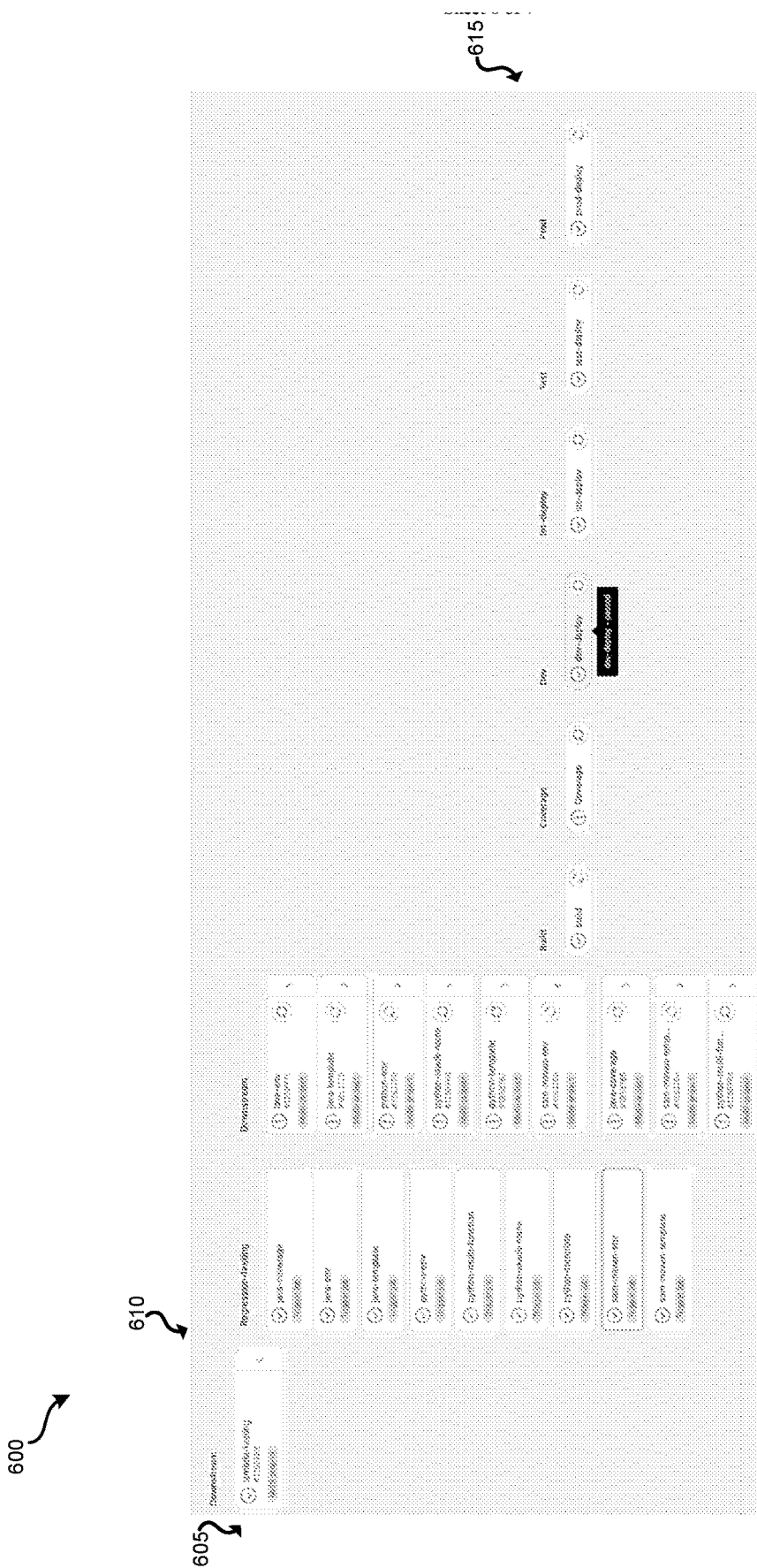
FIG. 6 illustrates a portion of an example user interface corresponding to an example pipeline run, in accordance with embodiments according to the present disclosure.

FIG. 6 illustrates a portion of an example user interface 600 corresponding to an example pipeline run, in accordance with embodiments of the present disclosure. The user interface 600 may facilitate use of the pipeline 202 with regression testing 605, which may include the testing automation features disclosed herein. The user interface 600 illustrates various apps 610 for different languages tested and different stages that run each test. In various embodiments, one or more of the stages may be automatic. With the user interface 600, the subsystem 300 may provide updates as pipeline runs 615 progress. In the example depicted, the build at the build stage is indicated as having failed. Various aspects of the user interface 600 and the pipeline run representation 615 may be expandable to drill into, for example, particular stages, apps, tests, etc. and expose further related details and options. For example, via user selection of the build failure, the user interface 600 may reveal what aspects are broken (e.g., a particular multifunction may be broken), the corresponding one or more test cases, and the one or more changes that are causing the failure.

With some embodiments, the user interface 600 may expose deployment stages of the pipeline 202 with user interface elements graphically depicting the deployment stages and current statuses of the deployment stages, along with user-selectable user interface elements for a user to provide input, make selections, and control aspects of testing of the pipeline 202. For example, the user interface 600 may include buttons to execute, pause, stop, cancel, and/or the like one or more operations and/or stages of the testing of the pipeline 202. By a user selecting a play button, for example, the pipeline stage may execute, and the process flow may transition to the next step/stage. The buttons may be configured to not be displayed, or be displayed but be unselectable, until the corresponding testing has progressed through the pipeline 202 such that one or more operations corresponding to the buttons are currently available as options.

In the event that the pipeline controller 308 determines from the running of at least one test application that one or more of the functionalities of one or more of the use cases is adversely affected by the software change (i.e., the potential software change failed one or more of the tests), the software change (e.g., with the corresponding merge request) may be prohibited/blocked from being made to the deployment pipeline 282-5. For example, the merge request may be blocked from being performed, and the proposed software change may be rolled back in the testing flow with notifications 382-6 (e.g., user interface notifications, push notifications, pop-up notifications, modal windows, messages, email notifications, and/or the like) regarding the pipeline failure (after which the software change potentially may be modified, and then the regression suite may be run again with the modified change to see if that fixes the issue). The pipeline controller 308 may map the software change to the one or more of the functionalities and the one or more of the use cases adversely affected by the software change and may expose the mapping, details, graphical indicia, and/or other corresponding data via a user interface, push notifications, pop-up notifications, modal windows, messages, email notifications, and/or the like.

Disclosed embodiments may provide for identification, learning, and recognition of pipeline changes 382-8 and use cases 382-9 to continuously evolve the pipeline change testing over time for subsequent testing, for example, using the pipeline monitoring engine 336 and/or the pipeline simulation engine 338 of the pipeline controller 308 in various embodiments. The monitoring engine 336 may access any suitable pipeline information to facilitate the subsystem 300 learning (e.g., by using one or more pipeline simulation engines 338) new pipeline changes 382-8 and use cases 382-9. For example, when a button is clicked, pertinent information may be captured from the pipeline. When a developer uses the pipeline, use data may be captured in order to learn new uses of the pipeline. Such information may be collected at any suitable time, including, for example, when a stage of the pipeline is kicked off, so the monitoring may take a snapshot of the pipeline configuration at that moment when the pipeline kickoff is triggered.

The pipeline simulation engine 338 may include a learning engine in some embodiments. The learning of pipeline changes 382-8 and/or use cases 382-9 may be based at least in part on successfully tested and approved software changes that are deployed and/or developer input 306 received via a user interface of the deployment pipeline. The learning engine may learn rules corresponding to one or more new software changes and/or uses. The learning engine may be an analysis engine configured to determine any suitable aspects pertaining to aspects of identification, learning, and recognition of pipeline changes in uses based at least in part on pipeline input 302 received and processed by the monitoring engine 336. The learning engine may include logic to implement and/or otherwise facilitate any taxonomy, classification, categorization, correlation, mapping, qualification, scoring, organization, and/or the like features disclosed herein. In various embodiments, the learning engine may be configured to analyze, classify, categorize, characterize, tag, and/or annotate data corresponding to pipeline input 302 and associated pipeline software changes and uses. The learning engine may employ one or more artificial intelligence (machine learning or, more specifically, deep learning) algorithms to perform pattern matching to detect patterns of metrics of pipeline input 302 and associated pipeline software changes and uses. In some embodiments, the monitoring engine 336 and/or the learning engine may facilitate one or more learning/training modes. Accordingly, the learning engine may facilitate machine learning or, more specifically, deep learning, to facilitate creation, development, and/or use of pattern data regarding pipeline input 302 and associated pipeline software changes and uses.

In some embodiments, the learning engine may learn from software changes and other pipelines processes as software changes are made and as the pipeline is used, making inferences from such monitored processes and corresponding input. Based at least in part on the monitoring and the pipeline input 302 received, the learning engine may create data composites, where each data composite may include pipeline information associated with one or more operations of the deployment pipeline. The learning engine may store data composites in data composite storage (e.g., linked with a table, index, key-value data structure, and/or the like). The data composites may include one or combination of metadata, objects, fields, parameters, code, references, locators, and/or the like. In some embodiments, the learning engine may learn different uses and corresponding attributes of the different types. The learning engine may specifications of the different use types and corresponding attributes in a table, index, key-value data structure, and/or the like in a use cases data storage 316 and/or pipeline data storage 312.

In some embodiments, the pipeline controller 308 may maintain an exact copy of the current deployment pipeline for testing purposes. As tested and approved software changes to the deployment pipeline are made to the deployment pipeline, the pipeline controller 308 may update the copy of the deployment pipeline to allow for full end-to-end testing. The subsystem 300 may allow the flexibility to instantiate and develop against any combination of or all the deployment pipeline and pipeline functions included in a pipeline declared state for the deployment pipeline. The subsystem 300 may control processes of updating the declared state, propagating updates via CI/CD (continuous integration, continuous delivery/deployment) pipelines and processes. Then any new change that the subsystem 300 brings online may then be mirrored in the updated copy so that the copy for testing remains in sync.

The pipeline controller 308 may maintain multiple, various declared states of the current deployment pipeline, which may include the equivalent of the mainline code in in the deployment pipeline. The declared state may specify all or a part of the deployment pipeline that the deployment pipeline is actually running. The pipeline controller 308 (e.g., using the pipeline monitoring engine 336 and/or simulation engine 338) may automatically make copies of all or part of the deployment pipeline in accordance with the declared pipeline state specifications. The subsystem 300 may maintain the declared state of the network by way of updates that are continuous and triggered by detected state changes in the network, periodic, on-demand and triggered by a test/development request, and/or the like. All the deployment pipeline configurations, functions, versions, topology, connectivity, and/or design may be specified as part of the pipeline declared state.

The declared pipeline state specifications may be the set of one or more templates for simulations, tests, and/or use cases. In various embodiments, the subsystem 300 may derive simulations, tests, and/or use cases based at least in part on the declared pipeline state specifications. Accordingly, the declared pipeline state specifications may correspond to a baseline with respect to which simulations, tests, and/or use cases may be generated. In some embodiments, the declared pipeline state specifications may facilitate the pipeline controller 308 creating parallel pipeline simulations and running parallel tests that allow for accelerated and efficient parallel testing on the same and/or different portions of the pipeline replica. Moreover, various embodiments may provide for mode test functionality so the deployment of many functions (e.g., on the order tens, hundreds, or more) at the same time may be tested. This may identify and allow for solving of the problem of runtime errors.

Figure 7:
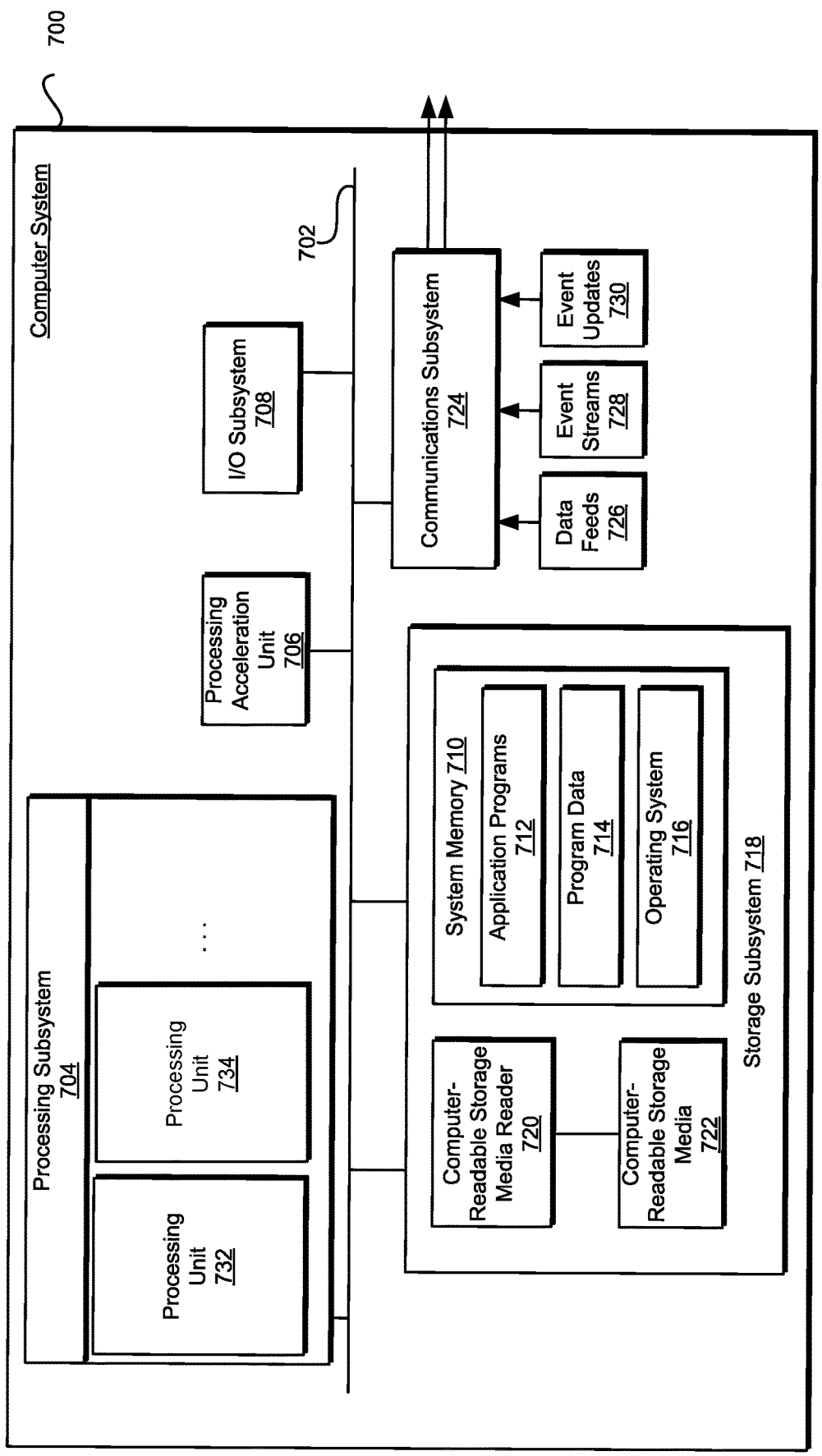
FIG. 7 illustrates an exemplary computer system, in accordance with embodiments according to the present disclosure.

FIG. 7 illustrates an exemplary computer system 700 that may be used to implement various embodiments. For example, in some embodiments, computer system 700 may be used to implement one or a combination of the pipeline infrastructure 102, subsystem 300, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine. In certain embodiments, a processing acceleration unit 706 may be provided for performing customized processing or for off-loading some of the processing performed by processing subsystem 704 so as to accelerate the overall processing performed by computer system 700. In some embodiments, the processing acceleration unit 706 may correspond to the acceleration engine 340.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device, game controllers, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random-access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random-access memory (SRAM), dynamic random-access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G, 5G, or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system comprising:
   one or more processing devices; and
   memory communicatively coupled with and readable by the one or more 4 processing devices and having stored therein processor-readable instructions which, when executed by the one or more processing devices, cause the one or more processing devices to perform operations comprising:

processing a software change operation within a deployment pipeline for testing and deploying a software change to a production computing service;

identifying that the software change operation corresponds to a software change with the deployment pipeline, where the software change is identified as being configured to make a pipeline change to a configuration of the deployment pipeline itself;

responsive to the identifying, invoking a regression suite configured to run a plurality of test applications on the deployment pipeline to test the deployment pipeline with respect to the software change, and running the plurality of test applications with the software change, where the running the plurality of test applications comprises:

simulating pipeline runs with a plurality of use cases, where the simulating the pipeline runs comprises:

for each simulation of a pipeline run with respect to a use case of the plurality of use cases:

identifying functionalities of the use case; and determining whether one or more of the functionalities of the use case is adversely affected by the software change;

where one or more of the simulations comprise using a dummy application, with its variables and associated configurations stored in a template, that is executed with respect to the deployment pipeline to test the software change;

determining from the running of at least one test application of the plurality of test applications that one or more of the functionalities of one or more of the use cases is adversely affected by the software change;

mapping the software change to the one or more of the functionalities and the one or more of the use cases adversely affected by the software change; and exposing the mapping via a user interface.

2. The system as recited in claim 1, where the software change operation corresponds to an instantiation of a branch of the deployment pipeline.

3. The system as recited in claim 1, where the software change operation corresponds to a merge request to merge a branch of the deployment pipeline into the deployment pipeline.

4. The system as recited in claim 1, where the software change operation corresponds to communicating code corresponding to the software change to a software repository system.

5. The system as recited in claim 1, where the software change comprises a change to a deployment pipeline template.

6. The system as recited in claim 1, where the simulating the pipeline runs comprises performing a test of a plurality of tests on the deployment pipeline for each use case of the plurality of use cases, and where each test of the plurality of tests is mapped to a particular use case of the plurality of use cases.

7. The system as recited in claim 1, the operations further comprising exposing, via the user interface, details of the one or more of the functionalities and the one or more of the use cases adversely affected by the software change.

8. A method comprising:

processing a software change operation within a deployment pipeline for testing and deploying a software change to a production computing service;

identifying that the software change operation corresponds to a software change with the deployment pipeline, where the software change is identified as being configured to make a pipeline change to a configuration of the deployment pipeline itself;

responsive to the identifying, invoking a regression suite configured to run a plurality of test applications on the deployment pipeline to test the deployment pipeline with respect to the software change, and running the plurality of test applications with the software change, where the running the plurality of test applications comprises:

simulating pipeline runs with a plurality of use cases, where the simulating the pipeline runs comprises:

for each simulation of a pipeline run with respect to a use case of the plurality of use cases:

identifying functionalities of the use case; and determining whether one or more of the functionalities of the use case is adversely affected by the software change;

where one or more of the simulations comprise using a dummy application, with its variables and associated configurations stored in a template, that is executed with respect to the deployment pipeline to test the software change;

determining from the running of at least one test application of the plurality of test applications that one or more of the functionalities of one or more of the use cases is adversely affected by the software change;

mapping the software change to the one or more of the functionalities and the one or more of the use cases adversely affected by the software change; and exposing the mapping via a user interface.

9. The method as recited in claim 8, where the software change operation corresponds to an instantiation of a branch of the deployment pipeline.

10. The method as recited in claim 9, where the software change operation corresponds to a merge request to merge a branch of the deployment pipeline into the deployment pipeline.

11. The method as recited in claim 8, where the software change operation corresponds to communicating code corresponding to the software change to a software repository system.

12. The method as recited in claim 8, where the software change comprises a change to a deployment pipeline template.

13. The method as recited in claim 8, where the simulating the pipeline runs comprises performing a test of a plurality of tests on the deployment pipeline for each use case of the plurality of use cases, and where each test of the plurality of tests is mapped to a particular use case of the plurality of use cases.

14. The method as recited in claim 8, further comprising exposing, via the user interface, details of the one or more of the functionalities and the one or more of the use cases adversely affected by the software change.

15. One or more non-transitory, machine-readable media having machine-readable instructions thereon which, when executed by one or more processing devices, cause the one or more processing devices to perform operations comprising:

processing a software change operation within a deployment pipeline for testing and deploying a software change to a production computing service;

identifying that the software change operation corresponds to a software change with the deployment pipeline, where the software change is identified as being configured to make a pipeline change to a configuration of the deployment pipeline itself;

responsive to the identifying, invoking a regression suite configured to run a plurality of test applications on the deployment pipeline to test the deployment pipeline with respect to the software change, and running the plurality of test applications with the software change, where the running the plurality of test applications comprises:

simulating pipeline runs with a plurality of use cases, where the simulating the pipeline runs comprises:

for each simulation of a pipeline run with respect to a use case of the plurality of use cases:
identifying functionalities of the use case; and
determining whether one or more of the functionalities of the use case is adversely affected by the software change;

where one or more of the simulations comprise using a dummy application, with its variables and associated configurations stored in a template, that is executed with respect to the deployment pipeline to test the software change;

determining from the running of at least one test application of the plurality of test applications that one or more of the functionalities of one or more of the use cases is adversely affected by the software change;

mapping the software change to the one or more of the functionalities and the one or more of the use cases adversely affected by the software change; and exposing the mapping via a user interface.

16. The one or more non-transitory, machine-readable media as recited in claim 15, where the software change operation corresponds to an instantiation of a branch of the deployment pipeline.

17. The one or more non-transitory, machine-readable media as recited in claim 15, where the software change operation corresponds to a merge request to merge a branch of the deployment pipeline into the deployment pipeline.

18. The one or more non-transitory, machine-readable media as recited in claim 15, where the software change operation corresponds to communicating code corresponding to the software change to a software repository system.

* * * * *

UNITED STATES PATENT AND TRADEMARK OFFICE
CERTIFICATE OF CORRECTION

| | | |
|---|---|---|
| PATENT NO. | : 12,174,732 B2 | Page 1 of 1 |
| APPLICATION NO. | : 18/174265 | |
| DATED | : December 24, 2024 | |
| INVENTOR(S) | : William Walker and Matthew Johnson | |

It is certified that error appears in the above-identified patent and that said Letters Patent is hereby corrected as shown below:

In the Claims

In Claim 1, Column 24, Line 63, please delete "4"

Signed and Sealed this
Fourth Day of February, 2025

Coke Morgan Stewart
*Acting Director of the United States Patent and Trademark Office*